Nov. 3, 1970  J. M. HERRING, JR  3,537,723

VEHICLE SUSPENSION SYSTEM FOR AIRCRAFT TRANSFER VEHICLE

Filed Sept. 25, 1968  8 Sheets-Sheet 1

INVENTOR.
James M. Herring, Jr.
BY
William R. Nolte
AGENT

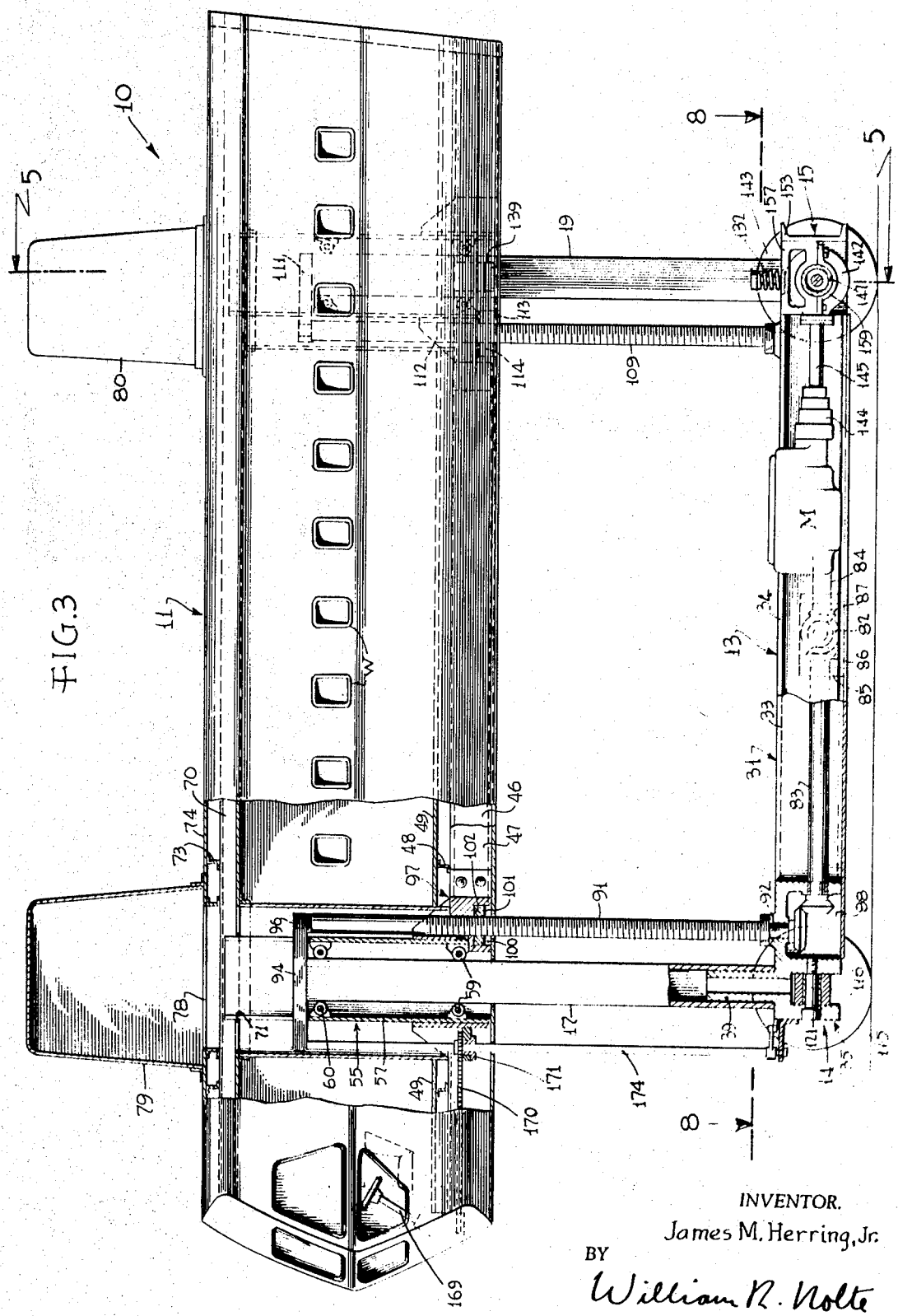

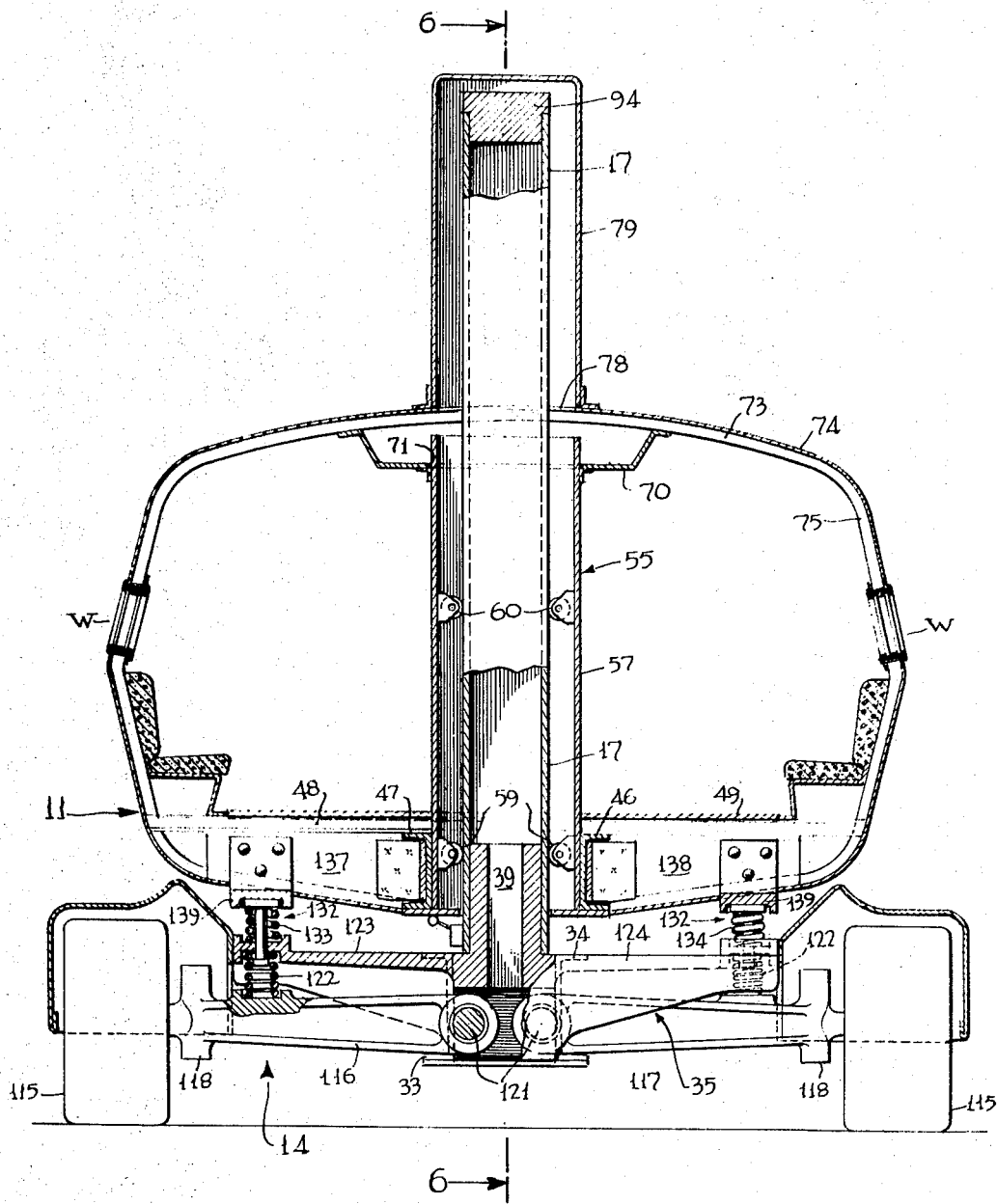

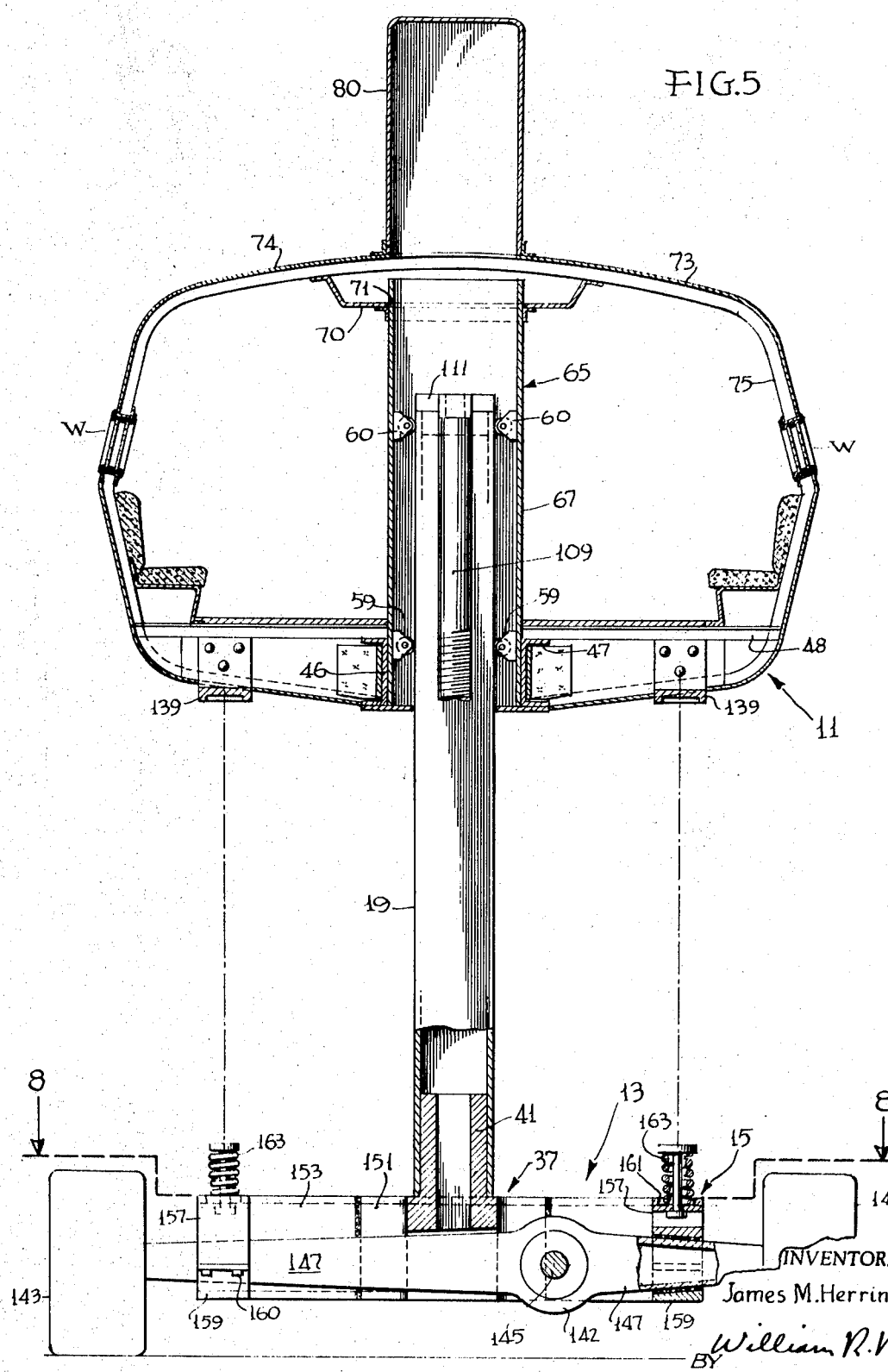

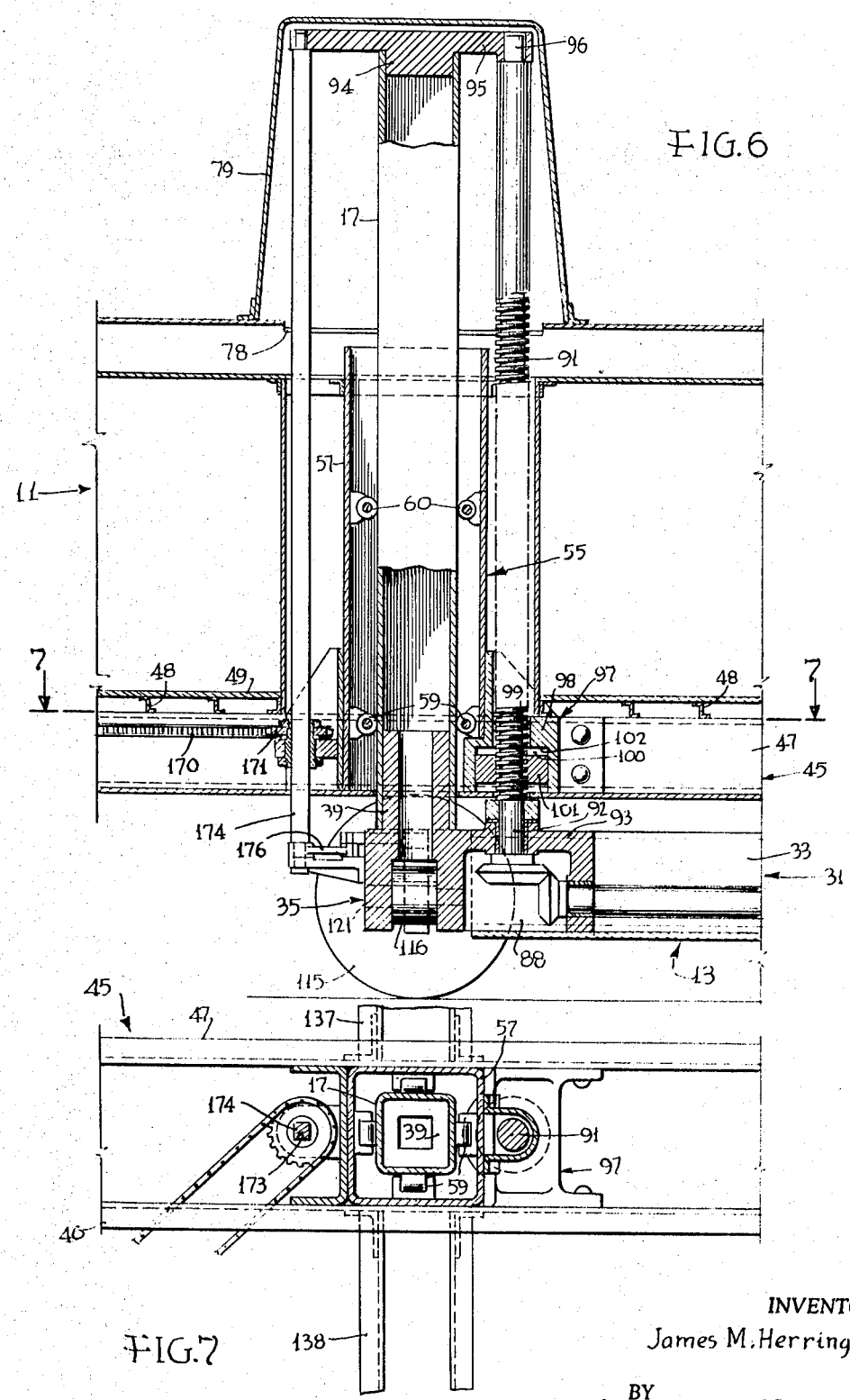

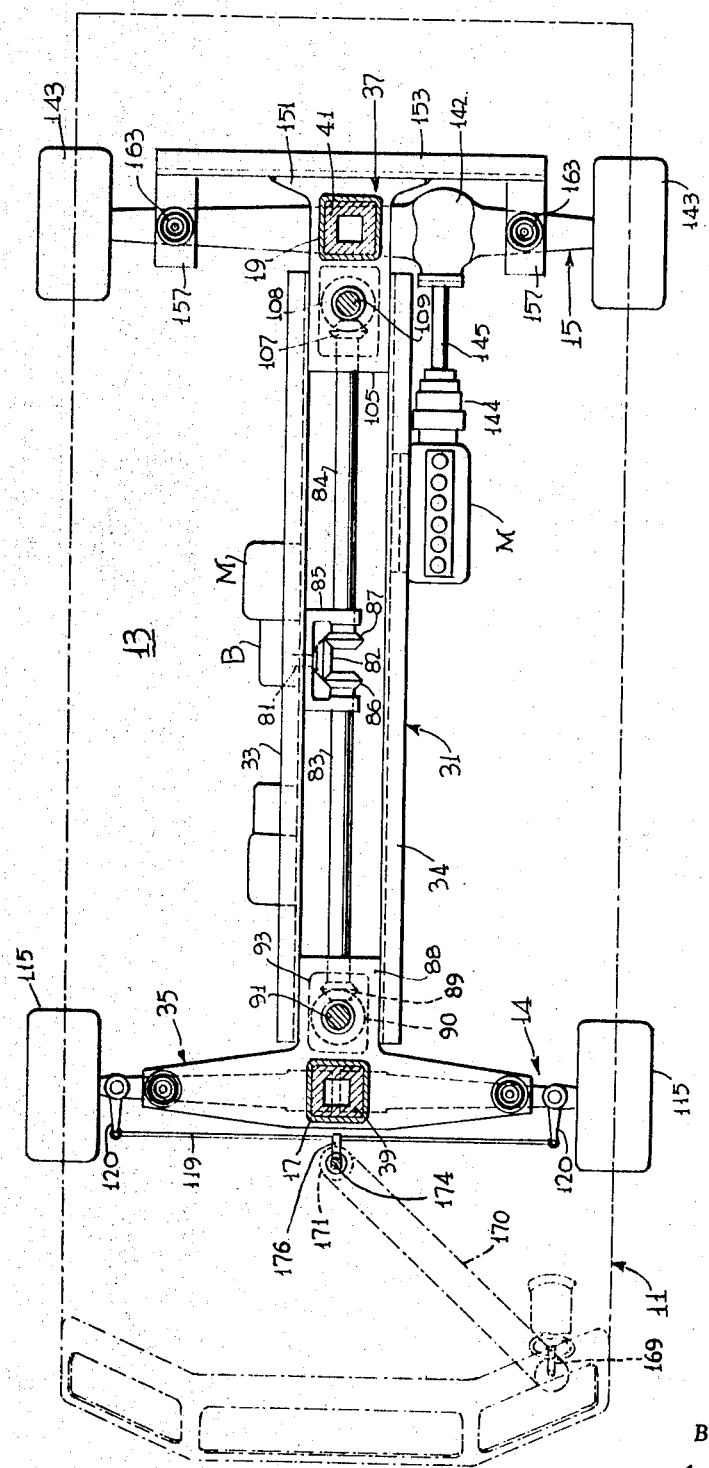

INVENTOR.
James M. Herring, Jr.
BY
William R. Nolte
AGENT

United States Patent Office 3,537,723
Patented Nov. 3, 1970

3,537,723
VEHICLE SUSPENSION SYSTEM FOR
AIRCRAFT TRANSFER VEHICLE
James M. Herring, Jr., Merion Station, Pa., assignor to
The Budd Company, Philadelphia, Pa., a corporation
of Pennsylvania
Filed Sept. 25, 1968, Ser. No. 762,445
Int. Cl. B60g 9/02
U.S. Cl. 280—124                                    4 Claims

ABSTRACT OF THE DISCLOSURE

A suspension system for an aircraft transfer vehicle which includes front axle members with pivots adjacent the center of the vehicle. Springs are interposed between the axle members outboard of their pivots and laterally extending rigid frame portions to provide road vibration isolation.

---

This invention has utility in connection with vehicles used to transport passengers or freight between an airport terminal and a parked aircraft. A major feature of a vehicle of this type is its ability to raise a passenger pod which contains passengers or freight to any elevation required to match the door sill of the aircraft and the height of a terminal loading area. The major components of the vehicle chassis frame of such a vehicle includes a longitudinally disposed torque tube having fore and aft lifting posts secured to its opposite ends. The raising and lowering of the passenger pod is accomplished by screws which cause the pod to be moved on the two vertical posts. It is apparent that such construction imparts most of the load to the axle members associated with the chassis along the longitudinal center of the vehicle. However, since the wheels carried by the axle units are outboard of the center a considerable distance, rather large bending moments are imparted to the axle units.

It is therefore an object of this invention to provide an improved suspension system for a vehicle having a pod which is raised or lowered to a given elevation and in which the loads are transmitted to an axle unit adjacent the center of the vehicle.

It is still another object of this invention to provide a suspension system for a vchicle which includes a pod which is mounted for slidable movement on a pair of vertical posts such that when the pod is in its lowermost position spring means are provided to cushion the weight relative to the chassis from which the upright poles are attached.

In accordance with the invention an improved mobile vehicle is provided to transfer passengers or freight between an air port terminal and a parked aircraft. The vehicle includes a passenger carrying pod which is mounted for slidable movement on a pair of vertical posts which in turn are secured in upright relation to the lower chassis of the vehicle. Axle means are pivoted to the chassis along the longitudinal center of the vehicle. Spring means interposed between the axle units and the chassis absorb the road shock as the vehicle travels along the ground surface. Additional spring means are provided between the chassis and the lower surface of the pod to enable cushioned movement of the pod when the latter is in its down postion and the vehicle is traveling along the airfield surface.

In the drawings, FIG. 1 is an elevational view of the vehicle embodying the invention shown postioned at a terminal building of an airport;

FIG. 3 is a longitudinal sectional view taken through the vehicle of FIG. 2 and shown partly in section and partly schematic;

FIG. 4 is a sectional view taken along the lines 4—4 of FIG. 3A;

FIG. 5 is a sectional view taken along the lines 5—5 of FIG. 3;

FIG. 6 is a sectional view taken along the lines 6—6 of FIG. 4;

FIG. 7 is a sectional view taken along the lines 7—7 of FIG. 6;

FIG. 8 is a sectional view taken along the lines 8—8 of FIG. 3, the pod shown in phantom lines;

Figure 1:
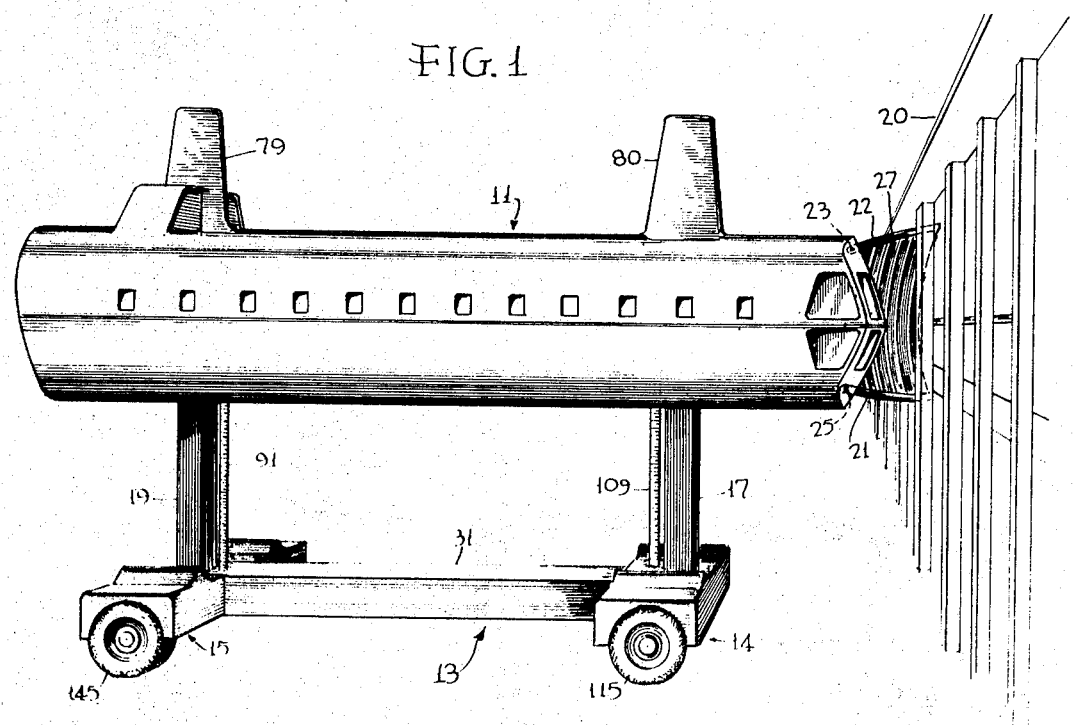
Figure 2:
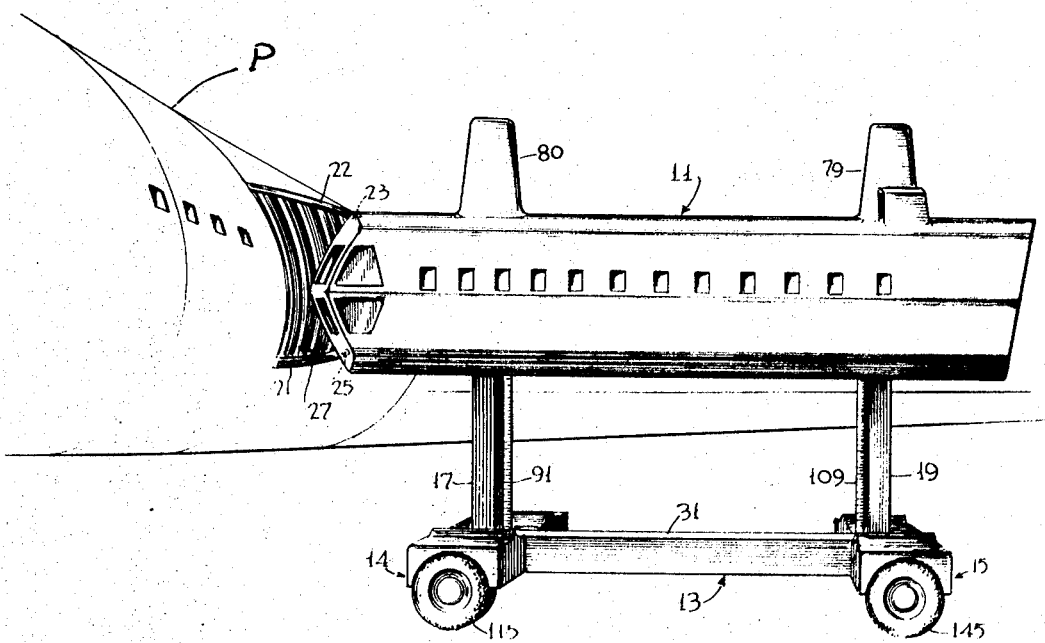
FIG. 2 shows the vehicle in a position servicing a parked aircraft.

Referring now to FIG. 1 of the drawing, there is shown a passenger vehicle, partly schematic of a complete passenger or freight carrying vehicle of the type embodying the invention. The vehicle 10 is shown as including a passenger or freight pod 11, a chassis 13 connected to a front axle unit 14 and a rear axle unit 15. The chassis includes a front lifting post 17 and a rear lifting post 19, both of hollow sleeve construction, each secured along the longitudinal axis of the chassis. The pod 11 is mounted for vertical movement, up and down, to match the height of the door sill of the floor of an airport terminal dock 20, or as shown in FIG. 2 the door sill height of a parked aircraft P. The vehicle includes a ramp structure 21 which may be extended from the pod to interface either the aircraft or the terminal building. The ramp structure includes an upper clam shell door 22 hinged as at 23 and a lower clam shell door 24 hinged as at 25. Side curtain members 27 extend between the upper and lower doors and are folded back within the pod when the clam shell doors are hinged to their retracted positions.

Figure 3A:
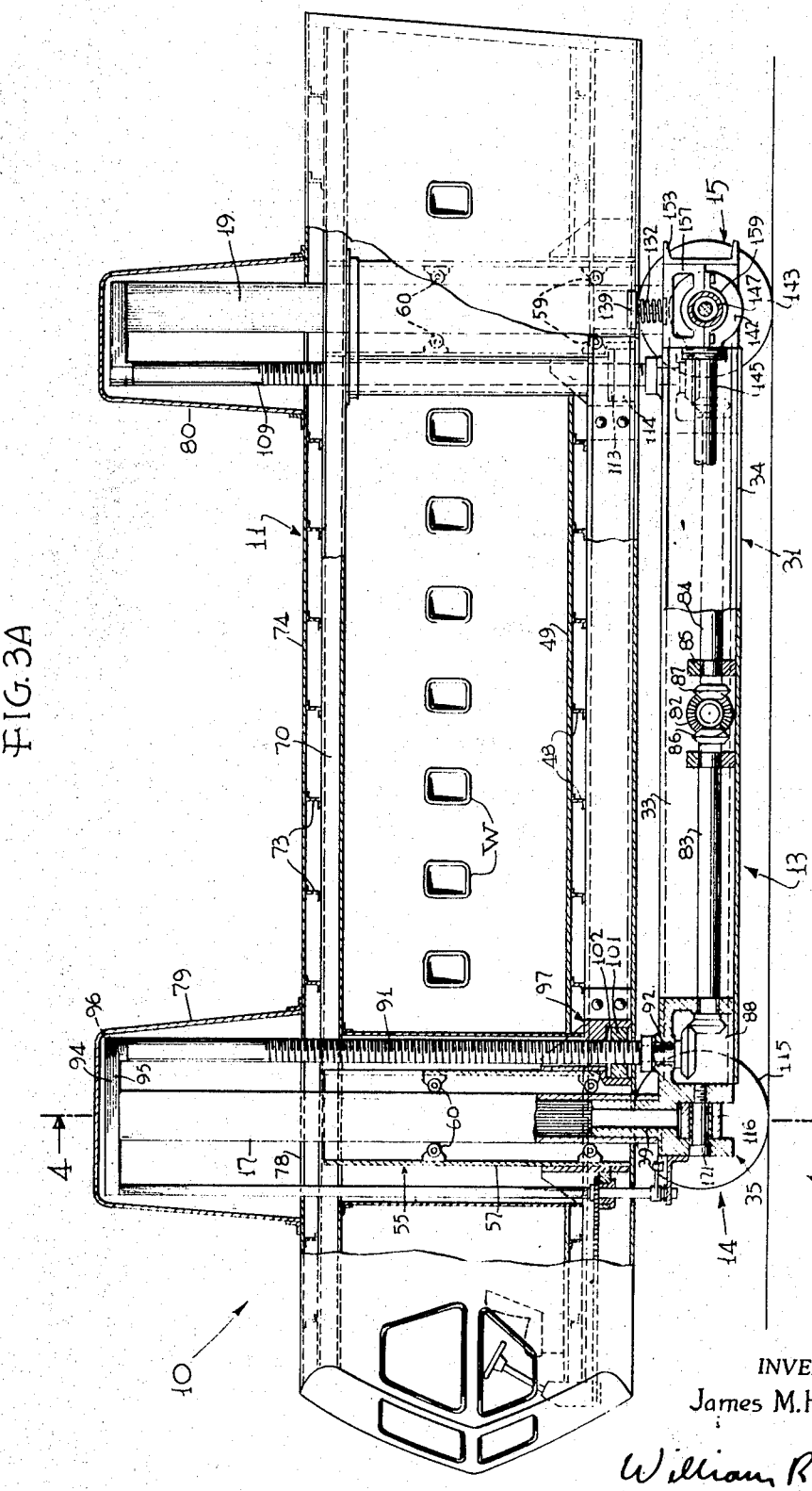
FIG. 3A is a view similar to FIG. 3 but showing the pod in its lowered position.

Referring now to FIGS. 3 and 3A, it is seen that the chassis 13 includes a longitudinal torque tube 31 extending between the front and rear axle units as seen in FIG. 8 and disposed along the central longitudinal axis of the vehicle. The torque tube 31 includes a pair of spaced apart channel members 33, 34 which sandwich a front housing 35 and a rear housing 37 therebetween. The front housing 35 which may be suitable casting includes a centrally located upright portion 39 which is received within the hollow sleeve portion of the front lifting post 17. The rear housing which may be of similar construction likewise includes an upright hollow portion 41 received within the interior of the rear lifting pole 19. The upper portions of the lifting posts 17 and 19 are unrestrained relative to the longitudinal torque tube 13. Any wind load or other lateral forces applied to the pod 11 are reflected in bending deflections of the posts. In order to minimize such deflections the upright portions 39 and 41 of the front and rear casting housing may vary in cross-sectional area and may extend to a desired height so as to provide the required rigidity of the lifting poles.

Referring now to FIGS. 6 and 7 it is seen that the vertical lifting pole 17 is of hollow construction and rectangular in cross-section. The pod 11 is shown as including a longitudinal center sill frame means 45 which consists of channel members 46 and 47 disposed in back to back relationship. Suitable transverse floor beam members 48 are disposed transversely to the channel member and support floor panels 49 to carry the passengers above. In order to permit vertical travel of the pod 11 from the position shown in FIG. 6 to that shown in FIG. 3 suitable guide means 55 are provided. The guide means include an enlarged rectangular sleeve 57. The sleeve is disposed vertically, and its base portion is gripped in sandwiched relationship between the aforementioned channel members 46, 47 defining the center sill of the pod. A plurality of roller means, 59 lower, and 60 upper, are provided interiorly of the sleeve member 55. The rollers 59, 60 are mounted by suitable means to the interior flat surfaces of the sleeve member 57 and ride on the external surfaces of lifting pole 17.

With reference now to FIG. 5 it is likewise observed that the rear lifting post 19 is traversed by similar rear guide means 65. The latter include a rear sleeve member 67 also rectangular in cross-section with lower rollers 59, upper rollers 60 disposed interiorly of the sleeve. The front sleeve member 57 and the rear sleeve member 67 are suitably joined by longitudinal upper roof channel member 70 which is suitably apertured as at 71, FIG. 4 to permit the passage of sleeve members 57 therethrough. The member 70 also facilitates the passage of airconditioning and lighting facilities therethrough. The aforementioned longitudinal channel member 70 is suitably secured to transverse roof carlin members 73 which in turn support a roof sheathing 74 thereabove. Suitable side frames 75 connect the roof elements 74 to the floor framing and may include windows as indicated at W. The lifting poles 17, 19 are of greater height than the height of the pod. In order to permit the passage of the top of the lifting poles 17 and 19 through the roof structure of the pod the latter include openings at 78 to enable the upper portions of the poles to project above the roof surface. See FIGS. 3 and 6. When the pod is in its lowered position as illustrated in FIGS. 3A and 6, the projecting upper portions of the lifting poles are concealed by means of shroud members 79 and 80. These members cap the openings to seal the roof from the weather and constitute a faring for the upper projecting end portions of the poles.

With reference now to FIGS. 3, 3A and 8, power means M are shown mounted on the longitudinal torque tube assembly 31. The power means are operable selectively independently from a cab portion provided in the forward portion of the pod to move the pod vertically relative to the lifting poles 17 and 19 respectively. For this purpose the power means M is shown connected to a suitable gear box and brake B to drive a stub shaft 81 carrying a bevel gear 82 thereon. A pair of horizontally aligned drive shafts 83, 84 are suitably journalled at each of their inboard ends by means of a centrally located housing 85 which is affixed to channel member 33 of the torque tube 31. The inboard end of shaft 83 includes a bevel gear 86 which meshes with drive gar 82. In a similar manner shaft 84 includes a bevel gear 87 likewise meshing with gear 82. The forward end of shaft 83 is journalled for rotation in the rear hollow-walled portion 88 of housing 35 and includes a bevel gear 89 at its end. A vertical shaft 91 is journalled as at 92 in the top wall 93 of the hollow casting portion 88. The shaft 91 includes a bevel gear 90 at its bottom and which meshes with bevel gear 89 and is threaded along its length, and is suitably supported for rotation in parallel relationship with lifting pole 19. For this purpose an upper fitting 94 is received in the top end of the lifting pole 17. The fitting 94 includes a rearwardly extending extension 95 which provides a journal 96 of the upper end of shaft 91. The center sill members 46, 47 of the floor of the pod secure a bulkhead housing 97 through which the lower end lifting screw 91 passes. The bulkhead 97 is suitably secured to the longitudinal center sill members.

The bulkhead housing 97 includes a top wall 98 with an opening 99 through which drive shaft 91 passes. The opening 99 is large enough to permit free rotation of shaft 91. The housing 97 further includes a cavity 100 to receive nut means 101 therein. The cavity 100 is of a size and shape to permit relative vertical movement of the nut means 101 to the fitting 97. The nut means 101 do not rotate in the cavity. When the shaft 91 is rotated in one direction the nut means 101 are caused to engage the bottom surface 102 of the top wall portion 98 of the casting and thereby exert an upward force through the fitting to lift the pod relative to the chassis. When the shaft 91 is rotated in an opposite direction however the lifting nut means 101 are caused to back away from the lifting surface 102 and thereby relieve the load on the shaft 91.

Still referring to FIGS. 3 and 8, the weight of the rear portion of the pod may be lifted relative to lifting pole 19 in a similar manner. For this purpose the rear horizontal drive shaft 84 is suitably journalled in the end wall 105 of housing 37. The rear end of the shaft 84 includes a bevel gear 107 which meshes with bevel 108 affixed to the lower extremity rear vertical drive shaft 109. The lower end of the shaft 109 is suitably journalled in the casting 37 and its upper end is received in a fitting 111 which in turn is secured to the top of lifting pole 19 in a manner similar to that previously described with respect to fitting 94 associated with the front lifting pole 17. A rear bulkhead lifting fitting or housing 112 is provided in the rear portion of the pod similar to the forward fitting 97. The fitting constitutes lifting plate means and is suitably secured to the rear portion of the center sill and enables the transfer of vertical forces from screw 109 to lift the pod along pole 19. A captive nut means 114 are received within a lower cavity portion 113 of the fitting. When horizontal shafts 83, 84 are driven in unison, the front and rear lifting screws 91 and 109 respectively are rotated and are effective to impart axial movement to their captive nut means 101 and 114, to cause the pod to traverse the lifting poles 17, 19 respectively. In this manner the pod is capable of being elevated to the floor level of most present and proposed aircraft and the second floor level of most present and proposed airport terminals.

With reference now to FIGS. 4, 9, 10 and 11, the front wheel axle unit 14 includes wheels 115 secured respectively to axle units 116, 117 by means of conventional kingpin joints 118. The wheels may be suitably rotated by steering rod 119 operating through links 120. The inboard ends of axles 116 and 117 are pivoted by pins 121, adjacent to longitudinal center line of the torque tube of the chassis. In order to absorb road vibration and shock as the vehicle travels along the air-field, spring suspension means 122 are interposed between the chassis frame and the axle units 116 and 117. For this purpose the front casting unit 35 which interconnects the upright pole 17 to the longitudinal torque tube 13 is provided with a pair of laterally offset arm portions 123 and 124. The latter arm portions are of inverted U-shape in cross-section and extend above the top surfaces of the axle segments 116 and 117. In the present instance the spring means 122 constitute coil spring elements 125 which are interposed between the top surfaces of axle segments 117 and the lower under surface of laterally extending arms 123, 124. Since each of the axle segments 116, 117 is independently pivoted, each segment may thus independently function to pivot about its respective pivot post 121 to absorb individual road shocks.

Figures 9, 10, 11:
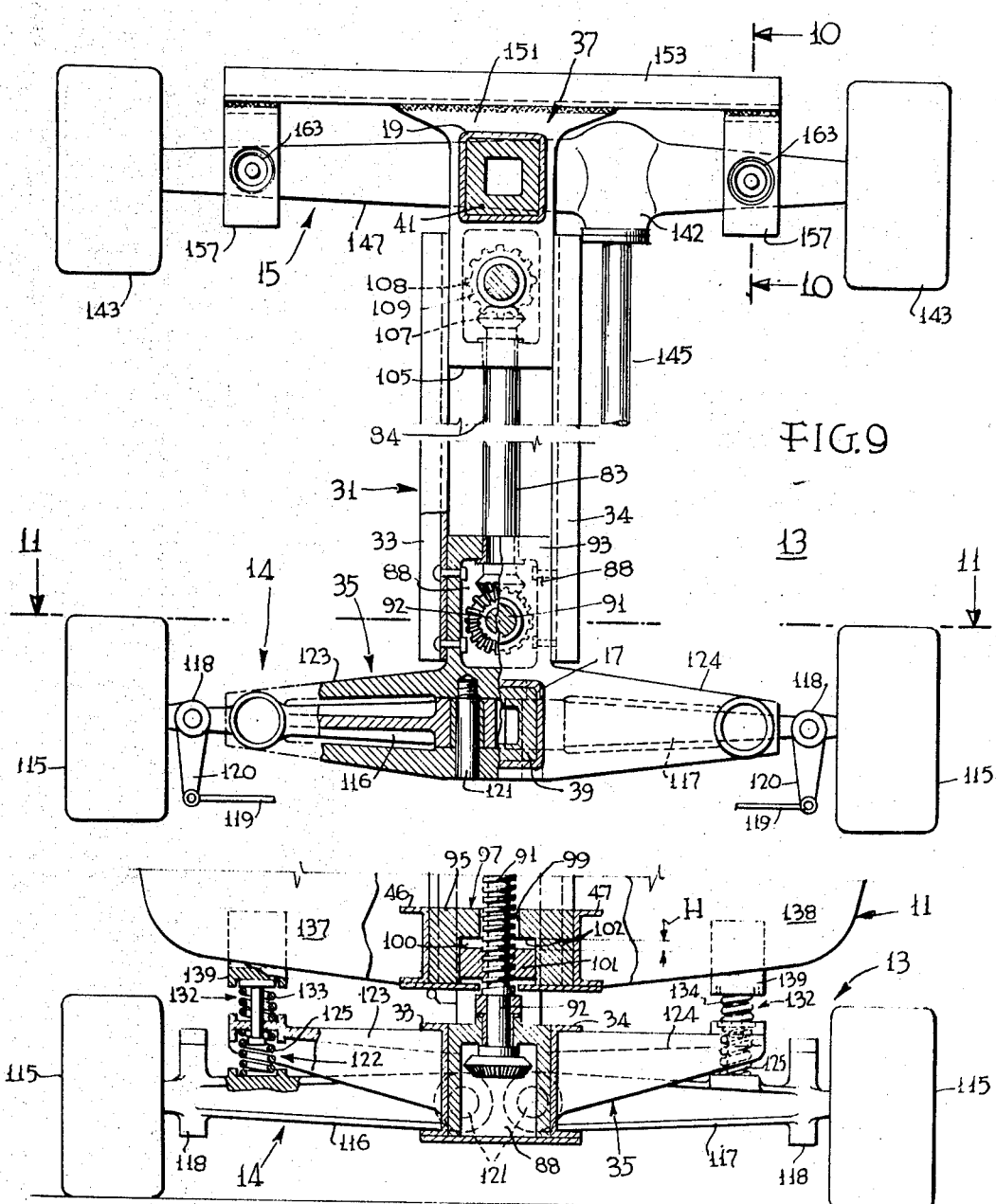
FIG. 9 is a view similar to FIG. 8 but showing the front and rear axle units in partial section.
FIG. 10 is a sectional view taken along the lines 10—10 of FIG. 9.
FIG. 11 is a view taken along the lines 11—11 of FIG. 9.

As previously mentioned the vehicle 10 normally travels with the pod 11 in its down position as illustrated in FIG. 4. Resilient cushion means 132 are provided to resiliently transfer the weight of the pod to the chassis. As best seen in FIGS. 4, 9 and 11 it is noted that the cushion means 132 include coil spring means 133, 134 interposed between the outer ends of transverse arm portions 123 and 124 respectively of casting member 35, and the lower bulkhead framing members 137 and 138 of the pod 11. The latter bulkhead members 137, 138 include additional angle supports 139 to provide a seat for the top convolutions of the springs. When the lifting screw 91 is rotated so that the pod is in its lowered position, the lifting nut means is run free of the pod floor as indicated by the distance H. In this position of the nut, the weight of the pod is supported on the springs 133, 134 and 163 respectively. Since the vehicle normally travels in the lower position of the pod as illustrated in FIG. 11 so it is thus apparent that the dynamic load of travel is not supported by the fore and aft lifting screws 91 and 109.

Referring to FIGS. 8 and 9, the rear wheel axle unit 15 includes a differential drive unit 142 and drive wheels 143. The power to drive the differential unit is provided from motor M through a suitable torque converter and transmission 144 and then through drive shaft 145 to the differential unit 142. The latter unit includes a rear differential axle housing 147 which extends laterally outwardly from the torque tube 31 and supports the weight of the rear portion of the pod and chassis. The rear lifting pole housing 37 includes a T shaped rearwardly extending extension 151 to which a transverse channel member 153 is affixed as by welding. The I beam or channel member 153 extends laterally outwardly and its outer ends terminate short of the wheels 143. Tie blocks 157 are secured to the outer ends of member 153. See FIG. 10. The lower portion of the tie block 157 is arcuately curved as indicated at 158 to engage the top surface of the differential axle housing 147. A lower curved clamping member 159 is suitably fastened to the tie block 157 as by bolts 160 to rigidly secure the differential housing 147 to the transverse channel frame member 153. The upper portion of the tie block 157 is recessed as at 161 to provide a seat for spring 163 which is received in a recessed fitting 165 which in turn is gripped between spaced channel bulkhead members 167 of the pod underframing. It is thus observed that when the lifting screws 91 and 109 are rotated to their retracted positions their respective lifting nuts 101 and 114 relieve the loading on the lifting screws 91, 109 and thereby enable the load of the pod to be transferred to the forward suspension springs 133 and 134 and the rear differential springs 163.

With reference now to FIGS. 3 and 7 it is noted that vehicle is operated by an operator not shown in the forward end of the vehicle. Steering control is provided by a steering wheel 169 which at its base actuates chain 170 which in turn rotates sprocket 171 suitably mounted for rotation in the floor of the vehicle. The sprocket is centrally apertured as at 173 to receive vertical shaft 174. The lower end of the shaft is journalled for rotation to the forward end of housing 35 by bracket 175 and has affixed thereto an arm 176 which connected to the aforementioned steering rod 119. Rotation of the steering wheel 169 is effective to rotate arm 176 to thereby move rod 119. During vertical movement of the pod, the sprocket 171 with its square aperture 173 slides along the length of rod 174 which is rectangular in cross section. Similar control mechanism may be employed to control the throttle, brakes and the gear box of 144 of the vehicle.

It will be appreciated from the foregoing that although lifting screws have been utilized to cause the pod to slide up and down on the fore and aft vertical poles it should be obvious that alternate power lifting devices could be employed. For example, cables or chains or hydraulic cylinders could be used in lieu of the specific screw lifting arrangements shown in the foregoing figures.

While there has been shown what at present is considered to be the preferred embodiment of the invention it will be obvious to those skilled in the art that various changes and modifications may be made therein without departing from the invention and it is therefore aimed in the appended claims to cover all such changes and modifications as fall within the true spirit and scope of the invention.

What is claimed is:

1. A suspension system for a vehicle having a chassis frame including a longitudinally disposed torque tube and a pair of vertical lifting posts one at each end of said torque tube, a pod for carrying passengers mounted for movement along said posts, the combination comprising, means connecting each one of said lifting posts to said torque tube, axle means pivoted to said connecting means adjacent the intersection of one of said lifting posts and said torque tube of said chassis, said axle means having wheels affixed to its outer extremities, spring means interposed between said connecting means and said axle means adjacent their outer extremities, said connecting means being of inverted U-shaped cross section and extending laterally of said longitudinally disposed torque tube to overlie said axle means, and said axle means being movable between the downwardly depending arm portions of said U-shaped connecting means.

2. In the suspension system for a vehicle as set forth in claim 1 wherein said vehicle normally travels with said pod in its down position and wherein additional spring means are interposed between said laterally extending connection means and said pod means when the latter is in said down position.

3. In the suspension system for a vehicle as set forth in claim 2 wherein said spring means are vertically aligned with respect to said additional spring means.

4. A suspension system for a vehicle for transporting groups of passengers between an aircraft terminal and a parked aircraft, said vehicle having a chassis, said chassis including torque tube means disposed along the longitudinal axis of said vehicle, two lifting poles located one at each end of said torque tube means, means connecting said lifting poles to said torque tube means, wheel-axle means secured to said connecting means, said wheel axle means being directly beneath said connecting means and said lifting poles being supported directly above said connecting means, pod means mounted for movement along said lifting poles, spring means interposed between said connecting means and said pod means, means for moving said pod means along said lifting poles between a lowered position in which said pod means is supported by said spring means to enable cushioned movement of the pod means when the vehicle traverses the ground surface, to an elevated position of said pod means in which no loads are applied to said spring means by said pod means.

References Cited

UNITED STATES PATENTS

| 2,633,811 | 4/1953 | Poage | 105—164 X |
| 1,003,253 | 9/1911 | Hallett | 187—67 |

FOREIGN PATENTS

| 1,277,574 | 10/1961 | France. |
| 1,113,257 | 11/1955 | France. |

PHILIP GOODMAN, Primary Examiner

U.S. Cl. X.R.

105—164